(12) United States Patent
Kao et al.

(10) Patent No.: US 8,181,053 B2
(45) Date of Patent: May 15, 2012

(54) POWER SAVING DEVICE AND ALL-IN-ONE PC HAVING THE SAME FOR CONTROLLING STANDBY POWER TO MEMORY CONTROLLER AND MEMORY

(75) Inventors: Chin-Shan Kao, Taipei County (TW); Chih-Tsung Chu, Taipei County (TW)

(73) Assignee: MSI Computer(Shenzhen)Co., Ltd., Tangtou Village, Shiyan Town, Baoan District, Shenzhen, Guangdong Province (CN)

( * ) Notice: Subject to any disclaimer, the term of this patent is extended or adjusted under 35 U.S.C. 154(b) by 211 days.

(21) Appl. No.: 12/732,207

(22) Filed: Mar. 26, 2010

(65) Prior Publication Data

US 2011/0145610 A1 Jun. 16, 2011

(30) Foreign Application Priority Data

Dec. 16, 2009 (TW) .............................. 98223592 U

(51) Int. Cl.
*G06F 1/32* (2006.01)
(52) U.S. Cl. .............................. 713/323; 307/66; 365/29

(58) Field of Classification Search .................... 307/66; 365/27–29; 713/320, 323
See application file for complete search history.

(56) References Cited

U.S. PATENT DOCUMENTS

| | | | |
|---|---|---|---|
| 6,509,657 B1 * | 1/2003 | Wong et al. .................... 307/66 |
| 7,131,011 B2 * | 10/2006 | Westerinen et al. .......... 713/300 |
| 2005/0285570 A1 * | 12/2005 | Kumar et al. ................. 320/128 |

* cited by examiner

Primary Examiner — Albert Wang
(74) Attorney, Agent, or Firm — Winston Hsu; Scott Margo

(57) ABSTRACT

A power saving device is configured in an all-in-one PC and has a power module expandably composed of a plurality of Ni-MH cells linked up either in series connection or in parallel connection. When an external alternating power provides power supply for the PC, a charging circuit of the power saving device charges the power module. When the alternating power is out or the PC is operated to enter a power saving mode, a controller of the power saving device notifies the PC to enter the power saving mode, while the power module provides power for the memory and memory controller of the PC with low power consumption. The all-in-one PC consumes little power while in power saving mode and is capable of restoring to its normal mode in short time. The power saving device enhances the all-in-one PC with features of instant-on, long-time standby, and backup power provision.

14 Claims, 3 Drawing Sheets

US 8,181,053 B2

POWER SAVING DEVICE AND ALL-IN-ONE PC HAVING THE SAME FOR CONTROLLING STANDBY POWER TO MEMORY CONTROLLER AND MEMORY

BACKGROUND OF THE INVENTION

1. Field of the Invention

The invention relates to a power saving device, and more particularly, to a power saving device used in an all-in-one PC (AIO PC) and the AIO PC thereof.

2. Description of the Prior Art

Computers are commonly used in business meetings and daily life. However, moving a computer from one place to another requires shutting down the computer and turning the computer back on, which is troublesome. Thus, portable uninterrupted power supply systems have been developed to solve such power supply issues, primarily for portable computers. For example, a notebook uses Li-ion cells to supply the power, while the featured uninterrupted power system (UPS) is also quite usual to serve as the backup power supply in many solutions.

For power source such as the Li-ion cell, particular specification of the cells limits its accessibility and increase of its power capacity. Further, the Li-ion cell can not be over-charged, and requires an additional protection circuit to prevent explosion, not to mention the high price of the cell. Thus, the Li-ion cell carries more limitations and higher cost. On the other aspect, the UPS is cumbersome.

Additionally, for those trendy All-in-one PCs (AIO PC) that appeal to advantages of delicate fusion with the environment, they have become more like household appliances than mere computers. Hence, the AIO PCs are gradually needed to provide using experiences like an ordinary household appliance, exclusively the instant-on feature. Besides the aforementioned drawbacks of the Li-ion cells or the UPS, these power supply solutions are still unsatisfactory to the power supply requirement of the AIO PCs, i.e., instant-on without the provision of the alternating power from standby mode for an enough long period of time.

SUMMARY OF THE INVENTION

The invention aims at providing a power saving device that uses Ni-MH cells having features of high power density, small size, high safety, inexpensive cost, where the power saving device is incorporated into an All-in-one PC to have flexibility and expandability in using different sources of power supply, and also have instant-on capability even after a long time standby.

The invention provides a power saving device, built in a computer powered by an alternating power. The power saving device includes a power module, a charge circuit, converter circuit, and a controller. The power module supplies power for the computer when the alternating power is out. The charge circuit connects to the alternating power for receiving the alternating power to charge the power module. The converter circuit connects to the power module for converting and outputting the voltage of the power module to the computer. The controller connects to the computer for notifying the computer to enter a power saving mode when the alternating power is out.

The invention further provides a computer having power saving device and powered by an alternating power. The computer includes a motherboard and a power saving device. The power saving device includes a power module, a charge circuit, a converter circuit, and a controller. The power module supplies power for the motherboard when the alternating power is out. The charge circuit connects to the alternating power for receiving the alternating power to charge the power module. The circuit connects to the power module for converting and outputting the voltage of the power module to the motherboard. The controller connects to the motherboard for notifying the motherboard to enter a power saving mode when the alternating power is out.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
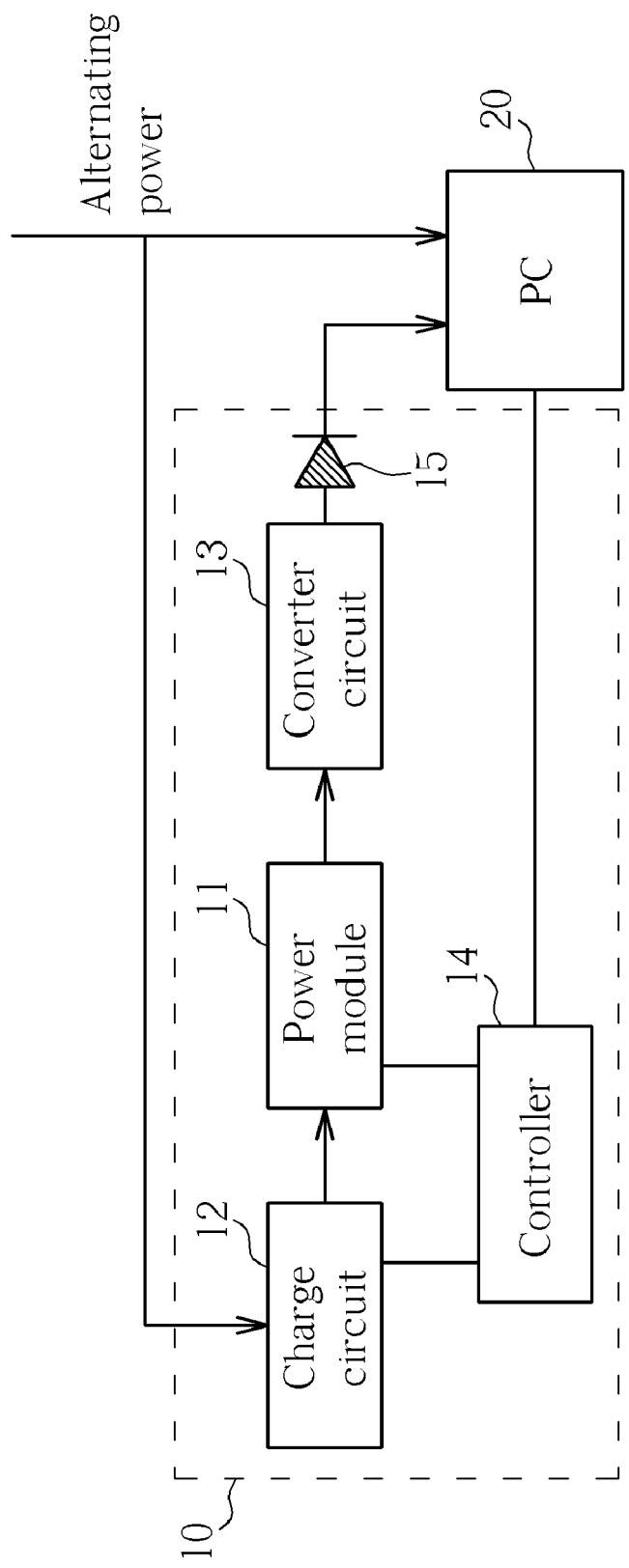
FIG. 1 is a schematic diagram of a power saving device of the invention applied on a computer.

Please refer to FIG.1. FIG.1 is a schematic diagram of a power saving device 10 of the invention applied on a computer 20. The computer 20 is preferably an All-in-one PC. The power saving device 10 is utilized for providing power for the computer 20 with its pre-charged power source when the external alternating power is out. As for the situation that the computer 20 is normally powered by the alternating power, the power saving device 10 charges its power module 11 at the same time. As shown in FIG.1, the power saving device 10 includes a power module 11, a charge circuit 12, a converter circuit 13, a controller 14, and a diode 15. The power module 11 includes a plurality of Ni-MH cells having features of high power density, small size, high safety, inexpensive cost, and linked up in series connection or in parallel connection. For a preferred embodiment, the power module 11 includes 6~10 Ni-MH cells in parallel connection and is expandable for more cells or replacement of the cells. With the rechargeable Ni-MH cells used in the power module 11, the charge circuit 12, which connects to the external alternating power, receives the power from the alternating power and charges the Ni-MH cells in the power module 11 when the computer 20 is also powered by the alternating power and normally functioning. The converter circuit 13 is also connected to the power module 11 and is used to convert the voltage of the power module 11, by use of charge pump technology, to a required power load and output the power of the power module 11 to the computer 20. The diode 15 is connected to the output end of the converter circuit 13 for preventing reverse power from the computer 20 and causing damage to the power saving device 10.

Figure 2:
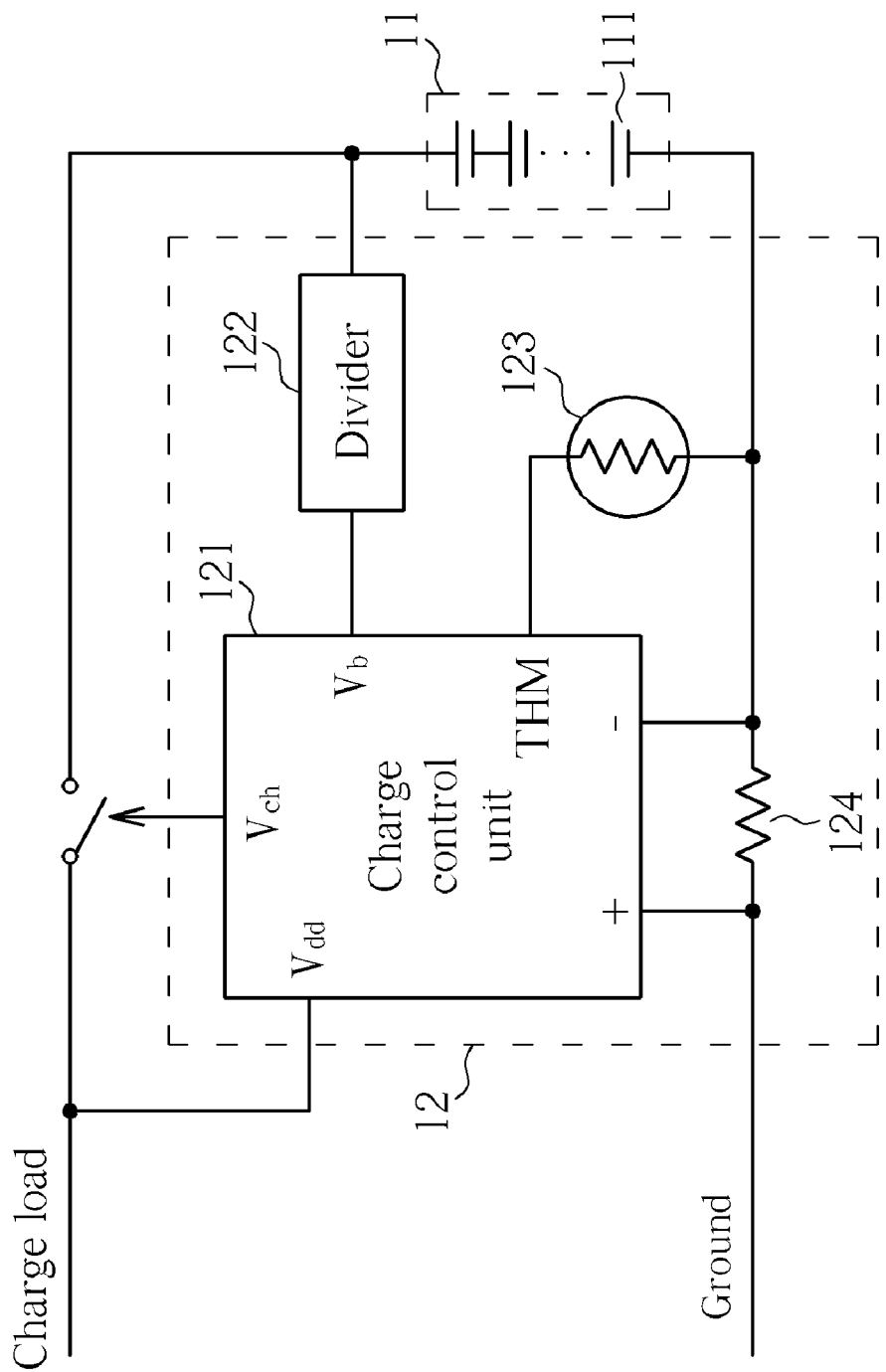
FIG. 2 is a schematic diagram of the power saving device showing the charge circuit and the power module.

Please refer to FIG. 2, which is a schematic diagram showing the charge circuit 12 and the power module 11 of the power saving device 10. The charge circuit 12 includes a charge control unit 121, a divider 122, a thermo-sensitive resistance 123, and a sensing resistance 124. The charge control unit 121 determines if the charge process of the Ni-MH cells is finished by use of −ΔV, the difference between the target charge voltage and the voltage $V_b$ of a single Ni-MH cell 111, retrieved from a cell charge curve, and by use of dT/dt, the temperature change rate of the Ni-MH cells 11. The sensing resistance 124 is further used for setting a standard charge current ratio, which preferably is set in ¼ of the normal charge current. Additionally, the $V_{ch}$ pin controls the charge load to charge the power module 11 when the alternating power is normally supplied, $V_{dd}$ pin determines the range of input voltage, preferably within 4.5V~16.5V, for charging the cells 111, and the divider 122 detects the voltage $V_b$ of each single Ni-MH cell 111 when considering the number of cells 111, preferably 1~10 cells, in serial connection. The divider 122 may be removed from the charge circuit 12 if the Ni-MH cells 111 of the power module 11 link up in parallel connection. The charge control unit 121 uses the thermo-sensitive resistance 123 to detect the temperature change of the power module 11 so as to determine if the charge process is finished. It can be easily know by any person skilled in the art to operate the thermo-sensitive resistance 123 and the detailed description is omitted here for brevity. The THM pin connecting to the thermo-sensitive resistance 123 also detects if the power module 11 is too high in temperature during the charge process and the charge process may be terminated if the temperature of the power module 11 is too high.

Figure 3:
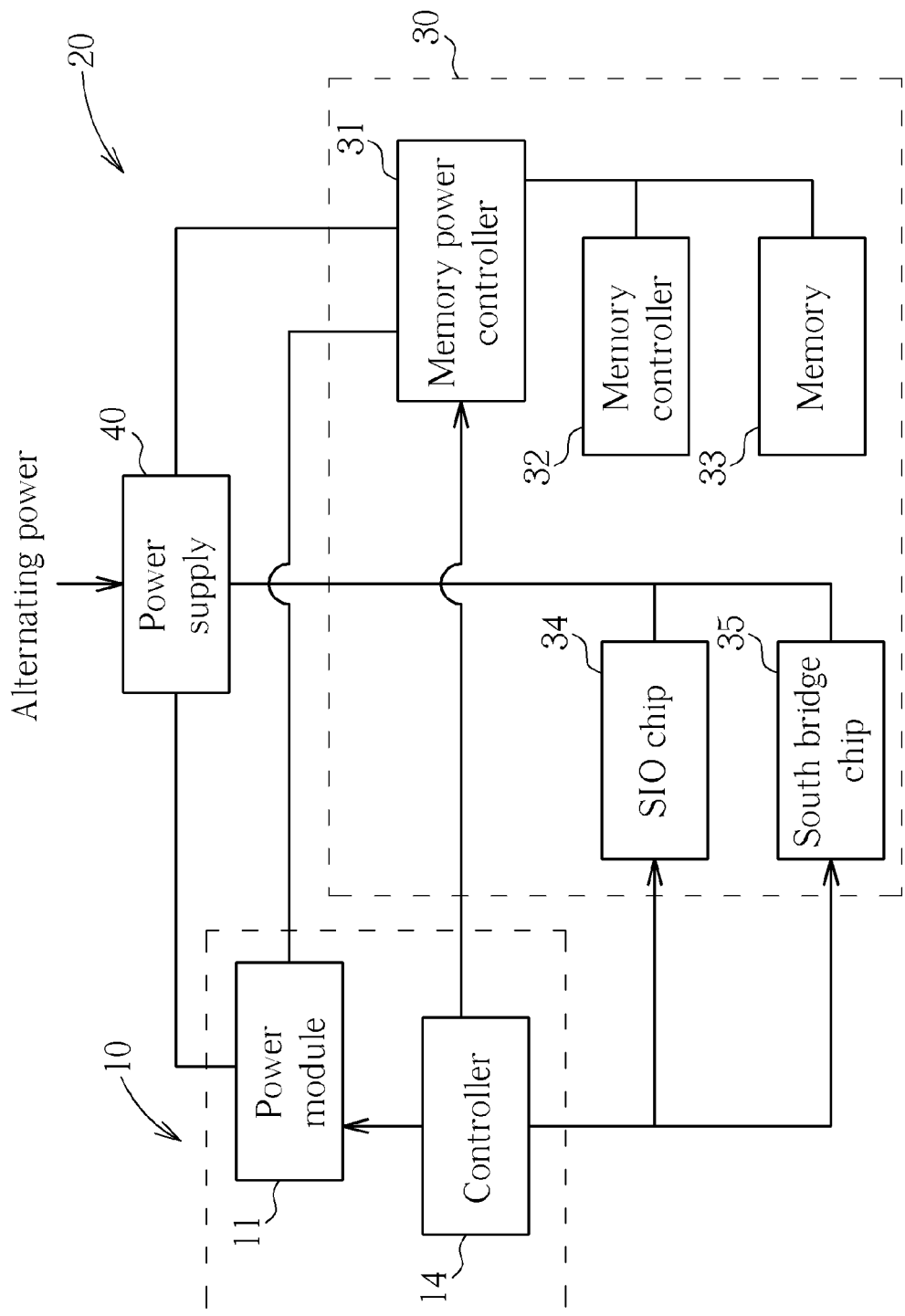
FIG. 3 is a schematic diagram of the power saving device supplying power for a motherboard.

Please refer to FIG.3. FIG.3 is a schematic diagram of the power saving device 10 supplying power for a motherboard 30 of the computer 20. The computer 20 is normally power supplied by the alternating power via a power supply unit (PSU) 40 receiving the alternating power and converting to DC power. The PSU 40 converts the received power to different voltages like 19V, 12V, 5V, 3.3V, and conveys the power to each component on the motherboard 30 and the motherboard 30 itself of the computer 20. FIG.3 shows only components mentioned in this embodiment and the other necessary components for a computer 20 are not shown in FIG.3 for brevity. As early mentioned, the power saving device 10 is capable of providing power with its pre-charged power for the computer 20 when the alternating power is out. The controller 14 also makes immediate response that uses an SLP_S3# signal of a south bridge chip 35 on the mother board 30 and uses a super I/O (SIO) chip 34 to notify the computer 20 to enter a power saving mode, where in this embodiment of the invention the computer 20 has various power control modes from S0 to S5 regulated by the advanced configuration and power interface (ACPI) standard. The S3 (suspend to RAM (STR)) power saving mode in ACPI provides power for a memory 33, a memory controller 32, the south bridge chip 35, and the SIO chip 34 to maintain data needed for the computer 20 to work in the S0 normal mode. When the computer 20 enters the S3 power saving mode, the controller 14 controls a memory power controller 31 on the motherboard 30 to switch the power supply for the memory 33 and the memory controller 32 by use of the power module 11 of the power saving device 10 and the data in the memory 33 under the S3 power saving mode may be maintained.

In addition to the safety backup solution provided by the power saving device 10 under sudden external power out, the power saving device 10 in the invention and the computer 20 with the built-in power saving device 10 may also save more power when the computer 20 enters the S3 power saving mode in normal operation. The power saving device 10 provides little power for maintaining the memory 33 and the memory controller 32 since only the memory 33 and the memory controller 34 are powered by the power saving device 10, without the need of providing power for the south bridge chip 35 and the SIO chip 34 in the conventional S3 power saving mode. The computer 20 or an AIO PC that uses the power saving device 10 as the power supply under power saving mode has very long standby duration, where the instant-on feature of the S3 power saving mode also remains.

Additionally, the power module 11 of the power saving device 10 may provide power with low voltage, for example, 1.5V being enough for the requirement of the memory 33 and the memory controller 32, since the provision of power by the power saving device 10 mainly for the low power consumption components. In other words, the primary power unit, the Ni-MH cells 111, of the power module 11 may be implemented in parallel connection. High voltage power output, 19V commonly existing in personal computers, required in other types of backup system is not necessary for the power saving device 10.

After the alternating power is resumed, the alternating power provides power for the SIO 34 via the inversion of the PSU 40. The motherboard 30 then generates an RSMRST signal (by the controller 14 or the SIO chip 34) to the south bridge chip 35. The controller 14 waits for a predetermined period of time, mainly determined by the time that the motherboard 30 needs to finish generating the RSMRST signal and practically 100 ms, and outputs a control signal to the SIO chip 34, where the control signal practically a power on/off signal. The motherboard 30 then goes on the steps to restore from the S3 power saving mode to the S0 normal mode once the SIO chip 34 receives the power on/off signal.

The power saving device disclosed in the invention is configured in a computer, preferably an all-in-one PC, and has a power module expandably composed of a plurality of Ni-MH cells linked up either in series connection or in parallel connection. When the external alternating power provides power supply for the PC, the charging circuit of the power saving device charges the power module. When the alternating power is out or the PC is operated to enter the power saving mode, the controller of the power saving device notifies the PC to enter the power saving mode, while the power module provides power for the memory and memory controller of the PC with low power consumption. The all-in-one PC consumes little power while in power saving mode and is capable of restoring to its normal mode in short time. The power saving device enhances the all-in-one PC with features of instant-on, long-time standby, and backup power provision.

Those skilled in the art will readily observe that numerous modifications and alterations of the device and method may be made while retaining the teachings of the invention.

What is claimed is:

1. A power saving device, built in a computer powered by an alternating power, the computer comprising a memory power controller, a memory, and a memory controller, the power saving device comprising:

a power module directly connected to the memory power controller for supplying power for the memory and the memory controller when the alternating power is out;

a charge circuit connected to the alternating power for receiving the alternating power to charge the power module;

a converter circuit connected to the power module for converting and outputting the voltage of the power module to the computer; and a controller connected to the computer for notifying the computer to enter a power saving mode when the alternating power is out, the controller directly connected to the memory power controller and utilized for switching the memory power controller such that the power module supplies power for the memory and the memory controller when the computer enters the power saving mode.

2. The power saving device of claim 1, further comprising a diode connected to an output end of the converter circuit.

3. The power saving device of claim 1, wherein the power module comprises a plurality of Ni-MH cells linked up in series connection or in parallel connection.

4. The power saving device of claim 1, wherein the charge circuit comprises a thermo-sensitive resistance for detecting temperature change of the power module when the charge circuit is charging the power module.

5. The power saving device of claim 1, wherein the controller is utilized for notifying the computer to enter an S3 (Suspend to RAM, STR) power saving mode regulated by the advanced configuration and power interface (ACPI) standard when the alternating power is out.

6. The power saving device of claim 5, wherein the controller is utilized for using an SLP_S3# signal of a south bridge chip of the computer and using a super I/O chip of the computer to notify the computer to enter the S3 power saving mode.

7. The power saving device of claim 6, wherein the controller is further utilized for outputting a control signal to the super I/O chip of the computer to control the computer to restore from the S3 power saving mode when the alternating power is resumed.

8. A computer having power saving device and powered by an alternating power, the computer comprising:
- a motherboard, comprising a memory power controller, a memory, and a memory controller electrically connected to one another;
- a power saving device, comprising:
  - a power module directly connected to the memory power controller for supplying power for the memory and the memory controller when the alternating power is out;
  - a charge circuit connected to the alternating power for receiving the alternating power to charge the power module;
  - a converter circuit connected to the power module for converting and outputting the voltage of the power module to the motherboard; and
  - a controller connected to the motherboard for notifying the motherboard to enter a power saving mode when the alternating power is out, the controller directly connected to the memory power controller and utilized for switching the memory power controller such that the power module supplies power for the memory and the memory controller of the motherboard when the motherboard enters the power saving mode.

9. The computer of claim 8, wherein the power module comprises a plurality of Ni-MH cells linked up in series connection or in parallel connection.

10. The computer of claim 8, wherein the charge circuit comprises a thermo-sensitive resistance for detecting temperature change of the power module when the charge circuit is charging the power module.

11. The computer of claim 8, wherein the controller is utilized for notifying the motherboard to enter an S3 (Suspend to RAM, STR) power saving mode regulated by the advanced configuration and power interface (ACPI) standard when the alternating power is out.

12. The computer of claim 11, wherein the controller is utilized for using an SLP_S3# signal of a south bridge chip of the motherboard and using a super I/O chip of the motherboard to notify the motherboard to enter the S3 power saving mode.

13. The computer of claim 12, wherein the controller is further utilized for outputting a control signal to the super I/O chip of the motherboard to control the motherboard to restore from the S3 power saving mode when the alternating power is resumed.

14. The computer of claim 8, wherein the computer is an all-in-one PC (AIO PC).

* * * * *